Sept. 25, 1934.     P. KÖHLER     1,974,716
ABSORPTION TYPE REFRIGERATING APPARATUS
Original Filed April 20, 1931
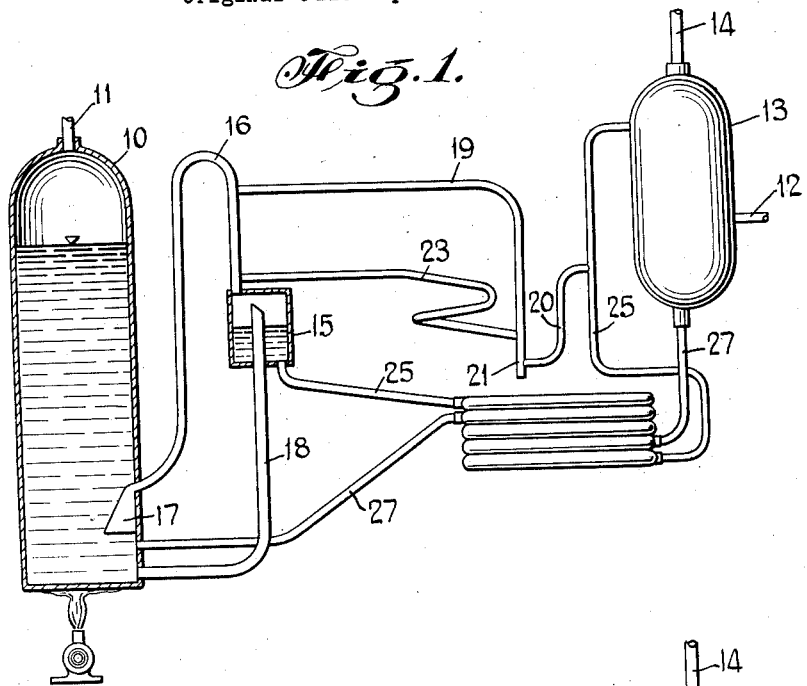
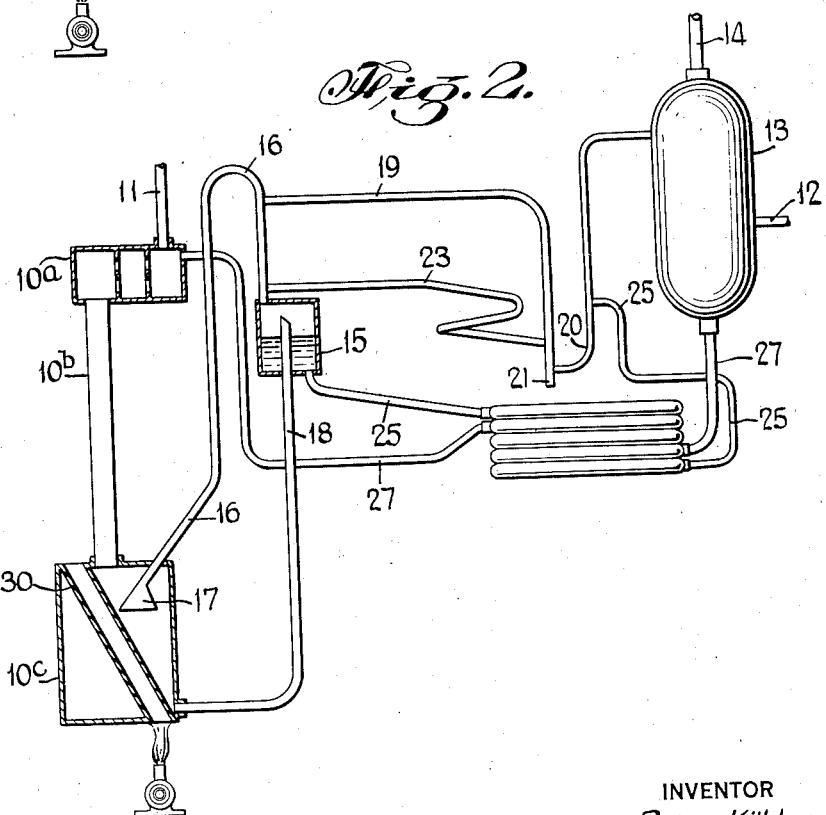
INVENTOR
*Peter Köhler*
BY
*A. Yates Dowell*
ATTORNEY Patented Sept. 25, 1934

1,974,716

UNITED STATES PATENT OFFICE 1,974,716

ABSORPTION TYPE REFRIGERATING APPARATUS

Peter Köhler, Stockholm, Sweden, assignor, by mesne assignments, to Electrolux Servel Corporation, New York, N. Y., a corporation of Delaware Application April 20, 1931, Serial No. 531,435. Renewed July 2, 1932. In Germany July 25, 1930

19 Claims. (Cl. 62—119.5)

This invention relates to absorption refrigerating apparatus of the pressure equalized type and more specifically to the circulation of absorption liquid between the generator and absorber in such apparatus.

An object of this invention is to provide an improved vapor liquid pump for raising weak absorption liquid from the generator to a level from which it flows to the absorber by gravity.

Other objects and advantages will be apparent from the following description taken in connection with the accompanying drawing, wherein;

Figure 1 shows schematically a generator and absorber of the well known pressure equalized type of absorption refrigerating apparatus and an arrangement contemplated by this invention for pumping weak absorption liquid from the generator to the absorber; and Figure 2 shows a modification of the generator in Figure 1 whereby the apparatus is less sensitive to slight inclinations in installation.

Referring to Figure 1 of the drawing a generator 10 containing a solution of refrigerant in an absorption liquid is provided with a connection 11 through which the gas expelled from solution in the generator passes as usual to a rectifier and condenser, not shown, in which latter the gas is liquefied and then conducted to an evaporator where it vaporizes into an auxiliary pressure equalizing gas, absorbing heat from the surrounding medium. The resulting gas mixture flows from the evaporator, not shown, through conduit 12 to the absorber 13 where the refrigerant gas is absorbed by the weak liquid entering the absorber through conduit 25, and the auxiliary gas passes through conduit 14 back to the evaporator. Enriched absorption liquid flows from the absorber through conduit 27 in heat exchange relation with the weak absorption liquid in conduit 25 back to the generator 10.

In order to circulate the absorption liquid between the generator and absorber a pump vessel 15 is provided and is located below the generator liquid level. A U-tube 16 has its curved intermediate portion above the generator liquid level with one leg terminating within and near the bottom of the generator 10 in a downwardly flaring opening or funnel 17 and the other leg connected to the top of the pump vessel 15. A conduit 18 connected at one end to the generator below the liquid level therein opens at its other end within the pump vessel 15 near the top thereof. A pipe 25 in heat exchange relation with the enriched absorption liquid return line 27 is connected at one end to the bottom of the pump vessel 15 and at its other end to the upper part of the absorber 13. A pipe 19 connected at one end to the part of the pressure pipe 16 located above the generator liquid level is connected at its other end 21 by a small valve pipe 20 to the pipe 25 adjacent the connection of the latter to the absorber 13. The valve pipe 20 is a substantially S-shaped or any shape such that it forms a small vertical tube entirely below the generator liquid level and connecting the end of pipe 19 to pipe 25. A pipe 23 of sufficient cross section that gas and liquid can pass each other freely therein is connected from the pressure pipe 16, below the generator liquid level and adjacent the connection to the pump vessel 15, to the pipe 19 above its connection with the valve pipe 20 and below the generator liquid level.

When the apparatus is not operating the liquid level is the same in generator 10, absorber 13, both legs of the pressure pipe 16, and the pipes 19 and 25. The pump vessel 15, pipe 18, pipe 27, and valve pipe 20 are completely filled with liquid. When the generator is heated by some means such as a gas burner, as shown, part of the gas expelled from solution will pass upwardly through the funnel 17 and collect above the liquid level in the pressure pipe 16. As the pressure increases, due to the accumulation of gas in the pipe 16, liquid will be forced downwardly in both legs of the pressure pipe and pipe 19. Liquid is also forced through pipe 23 and, due to the equal pressure in pipe 19, this liquid is forced through valve pipe 20 into the pipe 25. As the pressure in pipe 16 further increases liquid is forced downwardly in pipe 18 toward the generator and the liquid in the pump vessel 15 is forced through pipe 25 into the absorber. When the liquid in pipe 23 is forced down to the end 21 of the pipe 19 the gas displaces the liquid column in the valve pipe 20 and the end of pipe 25 adjacent the absorber, thus relieving the pressure in pipe 16 through pipe 23, pipe 19, valve pipe 20 and pipe 25 into the absorber. The lower end of the valve pipe 20 is connected to the pipe 19 at a level slightly below the bottom of the pump vessel 15 so that the latter will be emptied before the liquid seal in the valve pipe 20 is broken.

When the pressure in pipe 16 has been relieved in the absorber, liquid again flows into the pump vessel 15 from the generator through pipe 18. When the vessel is filled liquid rises in the leg of the pipe 16 until it reaches the connection of pipe 23 when it flows through the latter to the valve 20 during which time the gas pressure in pipe 16 is relieved into the absorber through pipe 19 and valve 20. Immediately the liquid flowing through pipe 23 reaches the lower end of the valve pipe 20 the latter is closed and the liquid in pipe 23 flows downwardly due to the inclination of this pipe making available a sufficient amount of liquid to seal the valve pipe 20. Since when the valve 20 is closed the increase of pressure in the pipe 16 and the pump vessel 15 necessary to force the liquid out of this valve pipe also raises the liquid column in the pipe 25 and since the latter is in front of the liquid column in the valve 20 the length of the sealing liquid column is increased the corresponding amount so that the pressure in the pump vessel will rise still further without forcing the liquid out of the valve. This continues until liquid overflows into the absorber and the pump vessel 15 emptied, whereupon the liquid seal is broken and the cycle repeated. With this arrangement the valve pipe 20 may be of very small size which presents the advantage that only very little sealing liquid is required and since the sealing liquid does not flow through the heat exchanger but is supplied directly to the absorber a minimum amount of solution not flowing through the heat exchanger is passed directly into the absorber.

The embodiment shown in Figure 2 differs from that in Figure 1 principally in the arrangement of the generator which is divided into three parts, an upper vessel 10a which functions as an analyzer, a connecting pipe 10b, and a lower vessel 10c in which latter the heating element shown as a flue 30 is located diagonally. The funnel 17 at the end of the pressure pipe 16 is located above the inclined flue which presents the advantage that heat is applied beneath the funnel 17 thus insuring a supply of gas for the pressure pipe 16 which makes the apparatus less sensitive to slight inclinations in installation. In this modification the pipe 27 for conducting the enriched absorption liquid from the absorber is connected to the analyzer 10a from which it flows in contact with and counterflow to the refrigerant gas expelled from solution in the vessel 10c.

In Figure 2 the valve pipe 20 is shown leading directly into the absorber 13 with the pipe 25 connected to the valve pipe 20 at the same level that the valve pipe 20 is connected to the pipe 25 in Figure 1. The exact arrangement is a matter of choice but the level of the connection between the pipes 20 and 25 must be such that liquid standing in the pipe 25 will not flow over and close the valve 20 before the pump vessel 15 is filled or before a sufficient quantity of sealing liquid has entered pipe 23. It is apparent that variations in design of the apparatus may be made. For instance pipes 19 and 23 may be combined into a single pipe of large diameter so that the gas pressure in pipe 16 is relieved through the upper part of the pipe until the valve 20 is closed by liquid flowing through the lower part of the pipe.

It will be obvious to those skilled in the art that various other changes may be made in the construction and arrangement without departing from the spirit of the invention and therefore the invention is not limited to what is shown in the drawing and described in the specification but only as indicated in the appended claims.

I claim:

1. In absorption refrigerating apparatus of the pressure equalized type means for circulating absorption liquid between the generator and absorber, comprising a pump vessel located below the generator liquid level, an inverted U-tube having one leg terminating in a downwardly flaring opening within the generator below the liquid level therein, its other leg connected to said pump vessel, and its intermediate portion located above the generator liquid level, a pipe connected to the generator below the liquid level therein and extending into the upper part of said pump vessel, a pressure equalizing pipe from the portion of said U-tube above the generator liquid level to the absorber, a U-bend liquid trap in said pressure equalizing pipe extending below the generator liquid level, a pipe connected at one end to the said U-tube adjacent its connection to said pump vessel and its other end connected to one leg of said U-bend liquid trap adjacent the bottom thereof, a pipe connecting the bottom of said pump vessel to the other leg of said U-bend liquid trap, and an enriched absorption liquid return pipe from the absorber to the generator, the last two said pipes being in heat exchange relation.

2. In absorption refrigerating apparatus of the pressure equalized type means for circulating absorption liquid between the generator and absorber comprising a pump vessel located below the generator liquid level, a pressure pipe having one end opening within the generator below the liquid level therein, its other end connected to said pump vessel, and an intermediate portion located above the generator liquid level, a liquid supply pipe from the generator opening in the upper part of said pump vessel, a pressure equalizing pipe connecting the intermediate portion of said pressure pipe to the absorber, a U-bend in said pressure equalizing pipe, a connection from the top of said pump vessel to one leg of said U-bend, a connection from the bottom of said pump vessel to the other leg of said U-bend, and an enriched absorption liquid return pipe from the absorber to the generator.

3. In absorption refrigerating apparatus of the pressure equalized type means for circulating absorption liquid between the generator and absorber comprising a pump vessel located below the generator liquid level, a pressure pipe having one end connected to the generator, its other end connected to said pump vessel, and an intermediate portion located above the generator liquid level, a liquid supply line from the generator opening in the upper part of said pump vessel, a pipe connecting the bottom of said pump vessel to the absorber, a liquid return pipe from the absorber to the generator, a pipe having one end connected to the intermediate portion of said pressure pipe and its other end connected through a liquid valve pipe to the absorber, and a liquid connection from the top of said pump vessel to said valve pipe.

4. In absorption refrigerating apparatus of the pressure equalized type means for circulating absorption liquid between the generator and absorber comprising a vapor liquid pump connected to discharge into the absorber, a weak liquid supply line from the generator to said pump, means for accumulating gas expelled from solution in the generator and applying the pressure of the accumulated gas to said pump to discharge liquid therein into the absorber, and a vent associated with said gas accumulating means adapted to be opened into the absorber responsive to increase of gas pressure in said means and closed responsive to decrease of gas pressure in said means.

5. In absorption refrigerating apparatus of the pressure equalized type means for circulating absorption liquid between the generator and absorber comprising a vapor liquid pump adapted to discharge into the absorber, a liquid connection between said pump and said generator, means for accumulating gas expelled from solution in the generator and applying the pressure of the accumulated gas to said pump to discharge liquid therein into the absorber, a liquid valve associated with said gas accumulating means to relieve the pressure in the latter to the absorber responsive to an increase in the gas pressure, and means for replacing sealing liquid in said valve responsive to the decrease of gas pressure in said gas accumulating means.

6. In absorption refrigerating apparatus of the pressure equalized type means for circulating absorption liquid between the generator and absorber comprising a vapor liquid pump adapted to discharge into the absorber, a liquid supply connection from the generator to said pump, means for accumulating gas expelled from solution in the generator and applying the pressure of the accumulated gas to said pump to discharge liquid therein into the absorber, a pressure relief pipe from said gas accumulating means to the absorber, a U-bend liquid valve in said pressure relief pipe, and means for replacing sealing liquid in said valve responsive to a decrease of gas pressure in said gas accumulating means.

7. In absorption refrigerating apparatus of the pressure equalized type means for circulating absorption liquid between the generator and absorber comprising a vapor liquid pump adapted to discharge into the absorber, a liquid supply connection from the generator to said pump, means for accumulating gas expelled from solution in the generator and applying the pressure of the accumulated gas to said pump to discharge liquid therein into the absorber, a liquid valve associated with said gas accumulating means to relieve the pressure in the latter to the absorber responsive to a predetermined increase in the gas pressure, and means for replacing sealing liquid in said valve from both sides thereof responsive to the decrease of pressure in said gas accumulating means.

8. In the art of refrigerating with an absorption system including a generator, a condenser, evaporator, and absorber connected for circulation of a cooling fluid; forming a body of absorption liquid due to liquid head in the generator, collecting by displacement below the liquid level vapor expelled from solution in the generator, applying the collected vapor to move said body of liquid upwardly into the absorber, and intermittently relieving the pressure of the collected vapor into the absorber to allow the reforming of said body of liquid.

9. In the art of refrigerating with an absorption system including a generator, an absorber, and a condenser in open communication with the vapor space in said generator; forming a body of absorption liquid due to liquid head in the generator, collecting by displacement below the liquid level vapor expelled from solution in the generator, applying the collected vapor to move said body of liquid upwardly into the absorber, balancing the pressure of the collected vapor by a liquid column, and intermittently displacing said column of liquid into the absorber to relieve the pressure and allow reforming of said body of liquid and re-establishing said column with liquid from the generator.

10. In an absorption refrigerating system including a generator, an absorber, and a condenser in open communication with the vapor space in the generator; a closed vessel connected in the system to receive weak absorption liquid under a liquid head in the generator and discharge at a higher level into the absorber, means for collecting below the liquid level vapor expelled from solution in the generator, and directing the vapor into said vessel, the accumulation of vapor creating a pressure reacting against said liquid head and raising liquid from the vessel into the absorber, and means for intermittently relieving the pressure of the accumulated vapor into said absorber to allow refilling of said vessel with liquid from the generator.

11. In an absorption refrigerating system including a generator, an absorber, and a condenser in open communication with the vapor space in said generator; a closed vessel connected in the system to receive weak absorption liquid under a liquid head in the generator and discharge at a higher level into said absorber, means for collecting below the liquid level vapor expelled from solution in the generator and directing the vapor into said vessel, the accumulation of vapor creating a pressure reacting against said liquid head and raising liquid from said vessel into said absorber, and a pressure relief vent from said vessel into said absorber having a liquid trap seal adapted to be broken and refilled with liquid from the generator responsive respectively to rise and fall of pressure in said vessel.

12. In a refrigerating system including a generator, condenser, evaporator, and absorber connected for circulation of a cooling fluid, a closed vessel extending below the generator liquid level, a conduit from the liquid space in said generator to said vessel, a rising conduit for liquid from said vessel to said absorber, means for collecting in said vessel vapor expelled from solution in said generator by displacement against a liquid head in the generator, and means for intermittently relieving the pressure of vapor in said vessel into said absorber to allow refilling of the former with liquid from said generator.

13. In a refrigerating system including a generator, condenser, evaporator, and absorber connected for the circulation of a cooling fluid, a closed vessel connected in the system to receive weak absorption liquid by gravity from said generator and discharge liquid at a higher level into said absorber, means for supplying vapor under pressure in said vessel, a vent from said vessel to said absorber, a liquid seal in said vent adapted to be broken responsive to a predetermined maximum pressure in said vessel and refilled with liquid from the generator upon a predetermined rise of liquid level in said vessel.

14. In a refrigerating system including a generator, a condenser, an evaporator, and an absorber connected for circulation of a cooling fluid, a chamber arranged to receive liquid by gravity from said generator and discharge at a higher level into said absorber, means for supplying vapor under pressure in said chamber, and a vent from said chamber to said absorber adapted to be opened responsive to a predetermined maximum pressure in said chamber and closed responsive to a preedetermined rise of liquid level in said chamber.

15. In a pressure equalized absorption refrigerating system including a generator and absorber, a chamber in said system arranged to receive liquid by gravity from said generator and discharge at a higher level into said absorber, means for supplying vapor under pressure in said chamber, a vent from said chamber to said absorber, a liquid trap seal in said vent adapted to be broken responsive to a predetermined maximum pressure in said chamber and refilled with liquid from opposite directions responsive to a predetermined rise of liquid level in said chamber.

16. In a pressure equalized absorption refrigerating system including a generator and absorber, a chamber in said system arranged to receive liquid by gravity from said generator and discharge at a higher level into said absorber, means for collecting in said chamber vapor expelled from solution in said generator by displacement against a liquid head, a vent from said chamber to said absorber, a liquid trap seal in said vent adapted to be broken responsive to a predetermined maximum pressure in said chamber and refilled with liquid from opposite directions responsive to a predetermined rise of liquid level in said chamber.

17. In an absorption refrigerating system of the pressure equalized type the method of circulating absorption liquid between the generator and absorber which includes, withdrawing weak absorption liquid from the generator, accumulating vapor expelled from solution in the generator by displacement against a liquid head in the latter, applying the pressure of the accumulated vapor to raise the withdrawn absorption liquid to a higher level toward the absorber, and intermittently venting said accumulated vapor into the absorber.

18. In an absorption refrigerating system of the pressure equalized type the method of circulating absorption liquid between the generator and absorber which includes, applying vapor under pressure to raise absorption liquid from the generator to a higher level toward the absorber, and intermittently by-passing said vapor around the liquid to be raised into the absorber.

19. In an absorption refrigerating system of the pressure equalized type including a generator and absorber, means utilizing vapor under pressure to raise absorption liquid from said generator upwardly toward said absorber, and means for intermittently relieving the pressure of vapor in the first said means into the absorber.

PETER KÖHLER.